US012603433B2

(12) United States Patent
Tian et al.

(10) Patent No.: US 12,603,433 B2
(45) Date of Patent: Apr. 14, 2026

(54) ANTENNA ELEMENT AND ANTENNA ARRAY COMPRISING SUCH ANTENNA ELEMENTS

(71) Applicant: HUAWEI TECHNOLOGIES CO., LTD., Shenzhen (CN)

(72) Inventors: Ruiyuan Tian, Helsinki (FI); Timofey Kamyshev, Helsinki (FI); Alexander Khripkov, Helsinki (FI); Janne Ilvonen, Helsinki (FI); Tuomo Katajamäki, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 18/311,737

(22) Filed: May 3, 2023

(65) Prior Publication Data

US 2023/0352840 A1 Nov. 2, 2023

Related U.S. Application Data

(63) Continuation of application No. PCT/EP2020/081275, filed on Nov. 6, 2020.

(51) Int. Cl.
*H01Q 9/04* (2006.01)
*H01Q 5/35* (2015.01)

(52) U.S. Cl.
CPC ............. *H01Q 9/0407* (2013.01); *H01Q 5/35* (2015.01)

(58) Field of Classification Search
CPC ....... H01Q 9/0407; H01Q 5/35; H01Q 9/0457
See application file for complete search history.

(56) References Cited

U.S. PATENT DOCUMENTS

| | | | | |
|---|---|---|---|---|
| 10,347,991 | B2 | 7/2019 | Zhang | |
| 2006/0103576 | A1* | 5/2006 | Mahmoud | H01Q 1/28 343/700 MS |
| 2020/0287287 | A1* | 9/2020 | Ying | H01Q 9/0407 |
| 2022/0013884 | A1* | 1/2022 | Zhao | H01Q 9/0457 |

FOREIGN PATENT DOCUMENTS

| | | | |
|---|---|---|---|
| CN | 105870620 | A | 8/2016 |
| CN | 106654549 | A | 5/2017 |
| CN | 110649376 | A | 1/2020 |

(Continued)

*Primary Examiner* — Dieu Hien T Duong
(74) *Attorney, Agent, or Firm* — Leydig, Voit & Mayer, Ltd.

(57) ABSTRACT

Antenna element comprising a patch antenna extending in a main plane, a conductive structure, a first feed line, and a second feed line. The conductive structure comprises a bottom element and at least one wall element, said wall element at least partially enclosing an aperture, said patch antenna being superposed over said aperture. First feed line and said second feed line extend from said bottom element across said aperture and are coupled to said patch antenna. Aperture may be configured to generate a first resonance frequency (F1) and a fourth resonance frequency (F4), and said patch antenna is configured to generate a second resonance frequency (F2) and a third resonance frequency (F3), (F1)>(F2)>(F3)>(F4). Patch antenna, said conductive structure, second vias, a dielectric gap, and/or a recess is configured to expand the bandwidth of one or several of said resonance frequencies.

20 Claims, 5 Drawing Sheets

(56) References Cited

FOREIGN PATENT DOCUMENTS

| | | | | | |
|---|---|---|---|---|---|
| CN | 110854529 | A | | 2/2020 | |
| CN | 111834747 | A | * | 10/2020 | |
| EP | 3065218 | A1 | | 9/2016 | |
| EP | 3621154 | A1 | | 3/2020 | |
| EP | 3709438 | A1 | | 9/2020 | |
| JP | 2019220886 | A | * | 12/2019 | |
| KR | 1672743 | B1 | * | 11/2016 | ............. H01Q 21/28 |
| WO | 2016127893 | A1 | | 8/2016 | |
| WO | 2017178037 | A1 | | 10/2017 | |
| WO | 2018063497 | A1 | | 4/2018 | |

* cited by examiner

ANTENNA ELEMENT AND ANTENNA ARRAY COMPRISING SUCH ANTENNA ELEMENTS

CROSS-REFERENCE TO RELATED APPLICATIONS

This application is a continuation of International Application No. PCT/EP2020/081275, filed on Nov. 6, 2020, the disclosure of which is hereby incorporated by reference in its entirety.

TECHNICAL FIELD

The disclosure relates to an antenna element comprising a patch antenna and a conductive structure.

BACKGROUND

Electronic devices need to support more and more radio signal technology. The technology may include cellular technologies, such as 2G/3G/4G radio, as well as non-cellular technologies. In the coming 5G new radio (NR) technology, the used frequency range will be expanded from sub-6 GHz to mmWave frequency, i.e. 26 GHz, 28 GHz, 39 GHz and 41 GHz. For mmWave frequencies, antenna arrays will be used to form beams with higher gain to overcome higher path loss in the propagation media.

However, an antenna radiation pattern and array beam pattern with higher gain will lead to narrow beam width. Beam steering techniques such as phased antenna arrays can be utilized to steer the beam towards different directions on demand. Furthermore, 5G use cases favor omnicoverage mmWave antennas with generally constant performance in order to achieve stable communication in all directions and orientations. Requirements for omnicoverage include dual-polarization, which enhances performance.

Furthermore, the size of electronic devices such as tablets and mobile phones is an important consideration when designing electronic devices. There is a trend towards very large displays which cover as much as possible of the electronic device, making the space available for antennas very limited and forcing either the size of the antennas to be significantly reduced, and performance impaired, or a large part of the display to be inactive.

SUMMARY

The present disclosure provides an improved antenna element.

According to a first aspect, there is provided an antenna element comprising a patch antenna extending in a main plane and a conductive structure comprising a bottom element and at least one wall element, the wall element at least partially enclosing an aperture and the patch antenna being superposed over the aperture. The antenna element further comprises a first feed line and a second feed line, the first feed line and the second feed line extending from the bottom element across the aperture and being coupled to the patch antenna.

Such an antenna element facilitates a compact antenna design which can cover a wide bandwidth of multiple frequencies with dual-polarization broadside radiation. Furthermore, generation of multiple resonance frequencies is facilitated.

In a possible implementation form of the first aspect, the feed lines are capacitively or galvanically coupled to the patch antenna.

In a further possible implementation form of the first aspect, at least one wall element comprises a plurality of first vias extending in parallel from a peripheral area of the bottom element towards the patch antenna, taking advantage of existing components such as e.g. a PCB and not having to add further components merely for the sake of antenna radiation.

In a further possible implementation form of the first aspect, the antenna element further comprises at least one isolation via extending in parallel with the plurality of first vias, the isolation via extending from a center area of the bottom element across the aperture and reduce the coupling between the first feed line and the second feed line. This allows the feed lines to be isolated from each other, improving the dual polarization achieved by means of the feed lines. The isolation via is capacitively or galvanically coupled to the patch antenna.

In a further possible implementation form of the first aspect, the antenna element further comprises at least one second via extending in parallel with the plurality of first vias, the second via extending from an intermediate area of the bottom element, across the aperture, the intermediate area extending between the center area and the peripheral area of the bottom element, facilitating expansion of the bandwidth of at least one antenna resonance frequency.

In a further possible implementation form of the first aspect, the patch antenna is not superposed over the second via(s).

In a further possible implementation form of the first aspect, the wall elements together form an equiangular and equilateral polygon, the bottom element of the conductive structure having a main surface area which extends in parallel with, and is larger than, a main surface area of the patch antenna, the main surface area of the patch antenna extending in the main plane. This facilitates proper operation of the antenna element with a proper front to back ratio and increased gain.

In a further possible implementation form of the first aspect, the wall element comprises at least one dielectric gap, and/or adjacent wall elements are separated by a dielectric gap, facilitating expansion of the bandwidth of at least one antenna resonance frequency.

In a further possible implementation form of the first aspect, the dielectric gap is a longitudinal slot extending in a direction perpendicular to the main plane.

In a further possible implementation form of the first aspect, the conductive structure comprises four wall elements and four dielectric gaps separating the wall elements.

In a further possible implementation form of the first aspect, the wall element is arranged in an L-shape, the L-shape extending along a corner of the bottom element of the conductive structure such that a first leg of the wall element extends partially along a first peripheral edge of the bottom element and a second leg of the wall element extends partially along a second peripheral edge of the bottom element, the first peripheral edge and the second peripheral edge extending perpendicular to each other.

In a further possible implementation form of the first aspect, the plurality of first vias are arranged in parallel lines forming at least one inner wall element and at least one outer wall element of the conductive structure, the inner wall element(s) at least partially facing the aperture, the outer wall element(s) at least partially extending adjacent a peripheral edge of the bottom element.

In a further possible implementation form of the first aspect, the patch antenna is one of a single center patch antenna and a stacked patch antenna, allowing a patch antenna which has a low profile or which provides larger bandwidth.

In a further possible implementation form of the first aspect, the stacked patch antenna comprises a center patch and at least one peripheral patch, the center patch and the peripheral patch(es) being stacked such that a main plane of the center patch and a main plane of the peripheral patch extend in parallel, or coplanar, with the main plane of the stacked patch antenna. This allows a dual band patch antenna which requires relatively little volume and is relatively cost efficient.

In a further possible implementation form of the first aspect, the outer dimensions of the center patch are the same, smaller, or larger, than the inner dimensions of the peripheral patch such that the peripheral patch encloses the center patch, or vice versa.

In a further possible implementation form of the first aspect, the first feed line and the second feed line are coupled to the center patch, the coupling being off-center with respect to a surface area of the center patch, the coupling optionally being arranged adjacent a peripheral edge of the center patch.

In a further possible implementation form of the first aspect, the center patch comprises a thoroughgoing recess, the recess optionally having a square cross-shape, facilitating expansion of the bandwidth of at least one antenna resonance frequency.

In a further possible implementation form of the first aspect, a surface area of the center patch is circular or forms an equiangular and equilateral polygon.

In a further possible implementation form of the first aspect, the peripheral patch has an inner peripheral edge having a shape corresponding to a shape of a peripheral edge of the center patch, such that a gap between the inner peripheral edge of the peripheral patch and the peripheral edge of the center patch is constant.

In a further possible implementation form of the first aspect, the patch antenna and the conductive structure are configured such that multiple resonance frequencies are achieved, wherein F1>F2>F3>F4.

In a further possible implementation form of the first aspect, the patch antenna is configured to generate a second resonance frequency and a third resonance frequency, and the aperture of the conductive structure is configured to generate a first resonance frequency and a fourth resonance frequency.

In a further possible implementation form of the first aspect, the dielectric gap is configured to expand a bandwidth of the third resonance frequency such that a fourth resonance frequency is generated.

In a further possible implementation form of the first aspect, the thoroughgoing recess is configured to expand a bandwidth of the second resonance frequency.

In a further possible implementation form of the first aspect, the patch antenna is configured to expand a bandwidth of the second resonance frequency and/or the third resonance frequency.

In a further possible implementation form of the first aspect, the conductive structure is configured to expand a bandwidth of the first resonance frequency and/or the fourth resonance frequency.

In a further possible implementation form of the first aspect, the second via is configured to expand a bandwidth of the first resonance frequency and/or the second resonance frequency According to a second aspect, there is provided an antenna array comprising a plurality of antenna elements according to the above, wherein the antenna elements are arranged such that at least one wall element of one antenna element is connected to a corresponding wall element of an adjacent antenna element. This facilitates a compact antenna array design which can cover a wide bandwidth of multiple frequencies with dual-polarization broadside radiation.

According to a third aspect, there is provided an apparatus comprising at least one antenna element or at least one antenna array according to the above.

These and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 7:
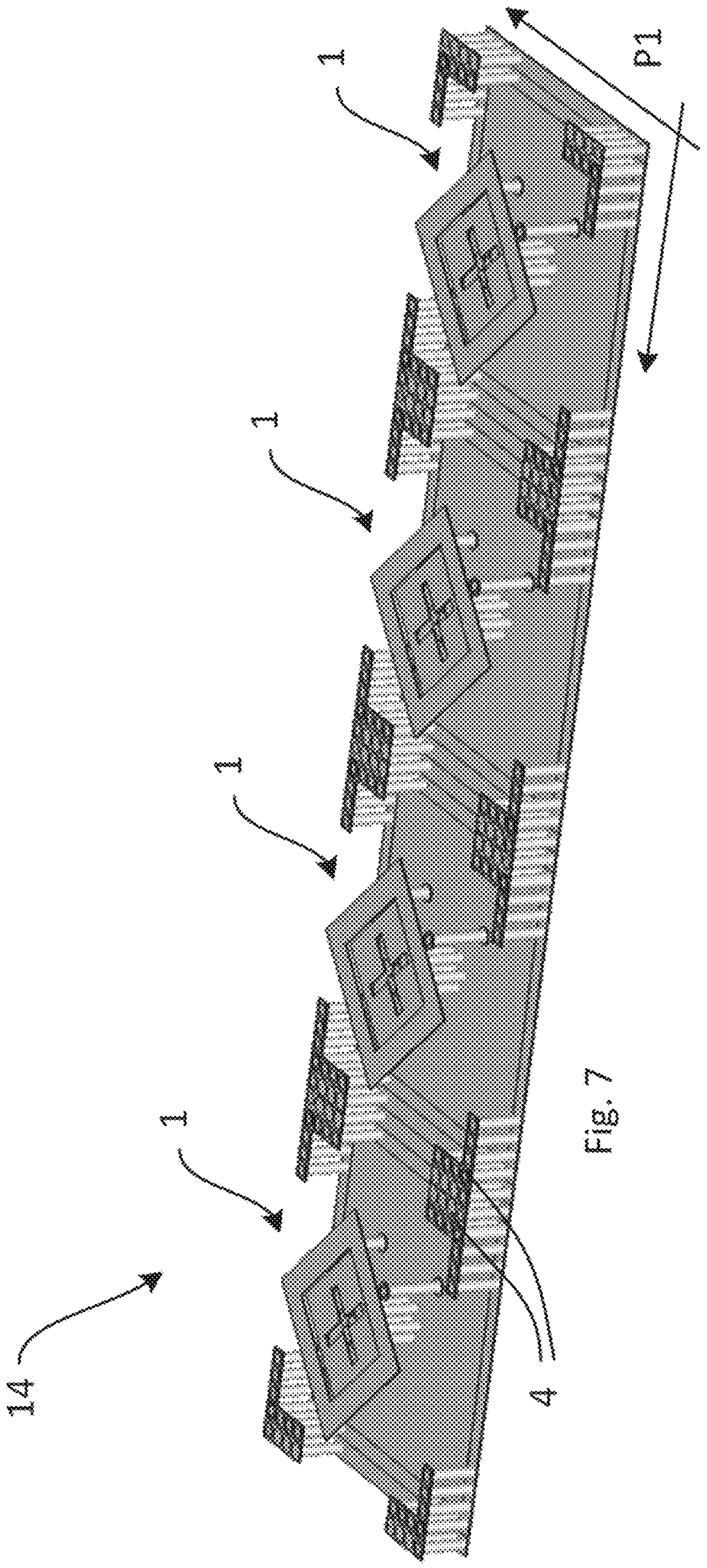
FIG. 7 shows a perspective view of an antenna array according to an embodiment.

FIG. 7 shows an antenna array 14 comprising a plurality of antenna elements 1 which will be described in more detail below. The antenna elements 1 are arranged such that at least one wall element 4 of one antenna element 1 is connected to a corresponding wall element 4 of an adjacent antenna element 1. The antenna elements 1 are arranged linearly, sequentially, and in the same plane, such that identical components are located at the same vertical location. FIG. 7 shows four such antenna elements 1, however, any suitable number of antenna elements 1 is possible. Furthermore, the antenna elements 1 may be arranged in an m×n pattern. For example, the matrix may e.g. comprise two parallel linear arrangements of two antenna elements 1 each, each linear arrangement extending in one plane such that the antenna elements 1 form rows as well as columns, i.e. a 2×2 matrix.

The present disclosure also provides an apparatus, such as a tablet or a smartphone, comprising at least one antenna element 1 or at least one antenna array 14.

Figure 1:
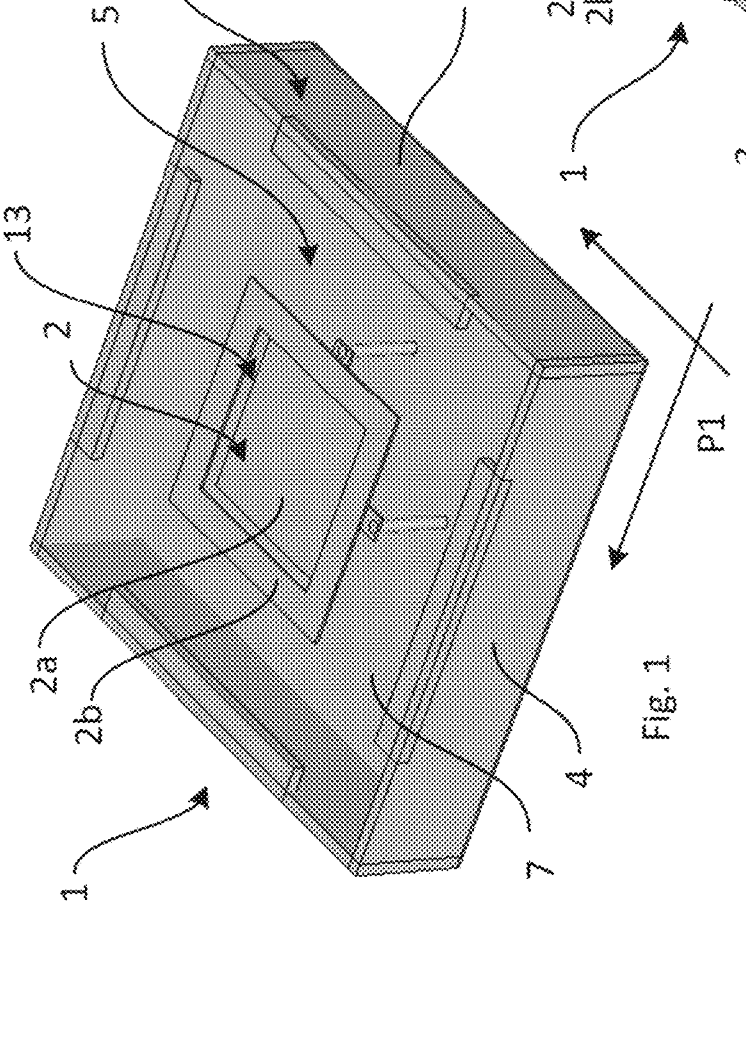
FIG. 1 shows a schematic perspective view of an antenna element according to an embodiment.

FIG. 1 shows an antenna element 1 comprising a patch antenna 2 extending in a main plane P1, a conductive structure 3, a first feed line 6*a* and a second feed line 6*b*.

The conductive structure 3 comprises a bottom element 7 and at least one wall element 4. The wall element 4 at least partially encloses an aperture 5, i.e. the bottom element 7 and the wall element(s) 4 are arranged such that they together form the aperture 5, for example by means of the bottom element 7 extending substantially in a main plane and the wall element(s) 4 extending perpendicular from the bottom element 7. The patch antenna 2 is superposed over the aperture 5, as shown best in FIG. 4, such that there is a dielectric filled distance between the bottom element 7 and the patch antenna 2.

The conductive structure 3 may comprise one integral wall element or several individual wall elements, preferably extending along the peripheral edge of the bottom element 7. The bottom element may be a printed circuit board (PCB) or similar. A first end of the first feed line 6*a* and a first end of the second feed line 6*b* may be electrically coupled to further feed lines situated below the bottom element 7, connected to a radio frequency integrated circuit (RFIC) (not shown).

The first feed line 6*a* and the second feed line 6*b* extend from the bottom element 7 across the aperture 5 and are both coupled to the patch antenna 2, facilitating dual-polarization and broadside radiation. A second end of the first feed line 6*a* and a second end of the second feed line 6*b* may be capacitively or galvanically coupled to the patch antenna 2. The first feed line 6*a* and the second feed line 6*b* may be probes.

Figure 3:
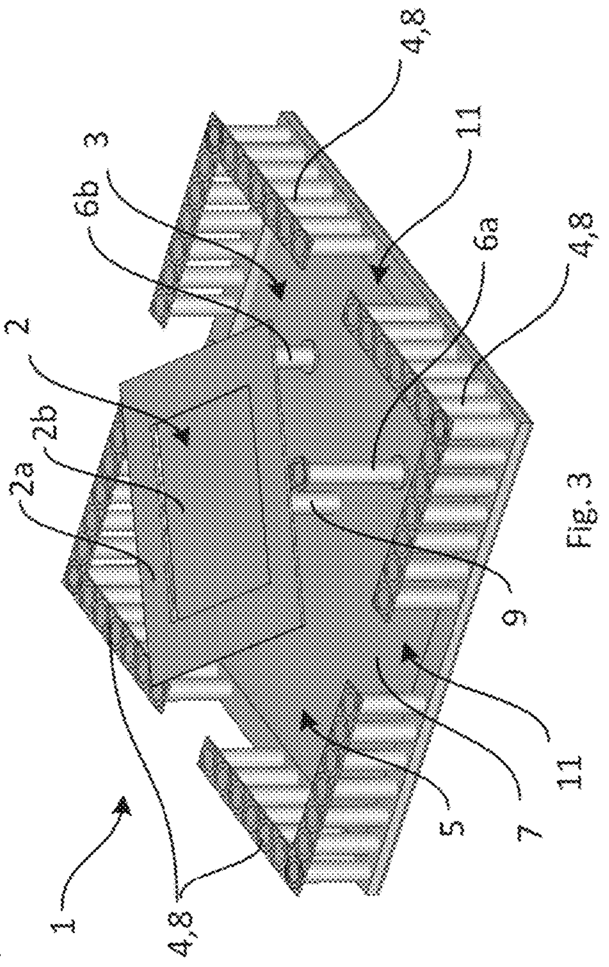
FIG. 3 shows a perspective view of an antenna element according to an embodiment.

As shown in FIG. 3, the wall element 4 may comprise, or be formed by, a plurality of first vias 8 which extend in parallel from a peripheral area A1 of the bottom element 7 towards the patch antenna 2. The peripheral area A1 extends adjacent, and includes, the peripheral edge of the bottom element 7. The first vias 8 may be implemented using a multilayer PCB technique.

Figure 6:
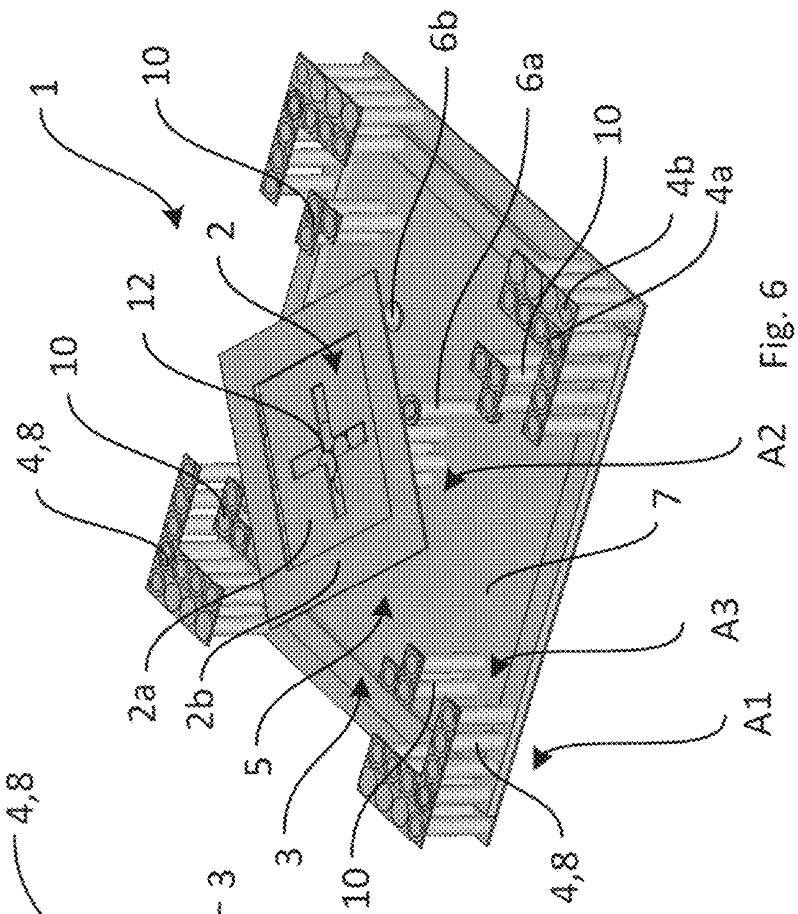
FIG. 6 shows a perspective view of an antenna element according to an embodiment.
Figure 5:
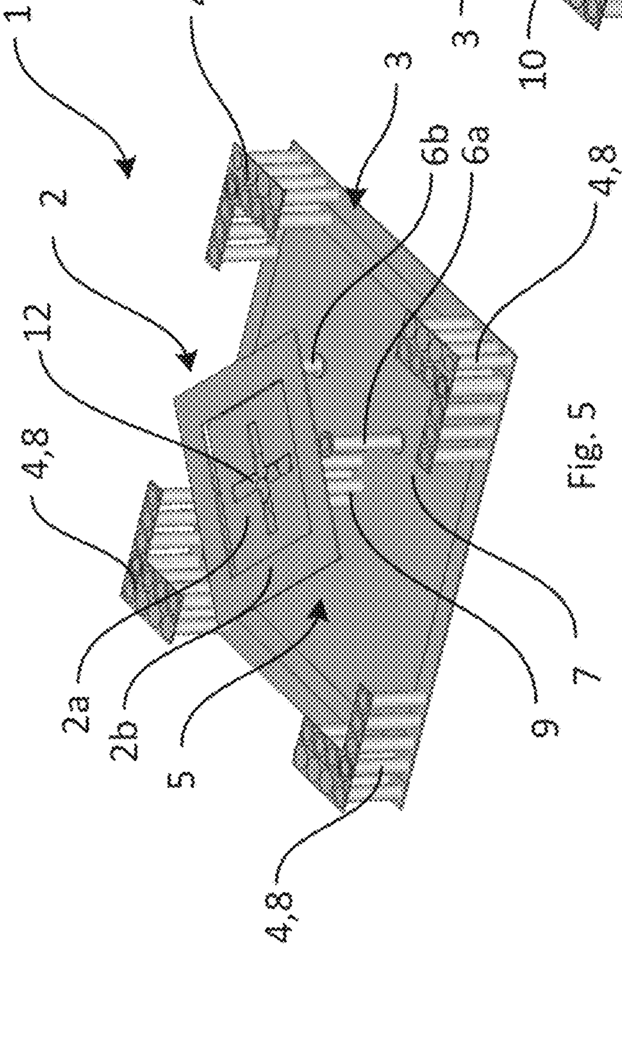
FIG. 5 shows a perspective view of an antenna element according to an embodiment.

The plurality of first vias 8 may be arranged in parallel lines forming at least one inner wall element 4*a* and at least one outer wall element 4*b* of the conductive structure 3, as shown in FIGS. 5 to 7. The inner wall elements 4*a* at least partially face the aperture 5, and the outer wall elements 4*b* at least partially extend adjacent a peripheral edge of the bottom element 7. In the case of an antenna array 14, outer wall elements 4*b* of adjacent antenna elements 1 extend adjacent each other.

Figure 4:
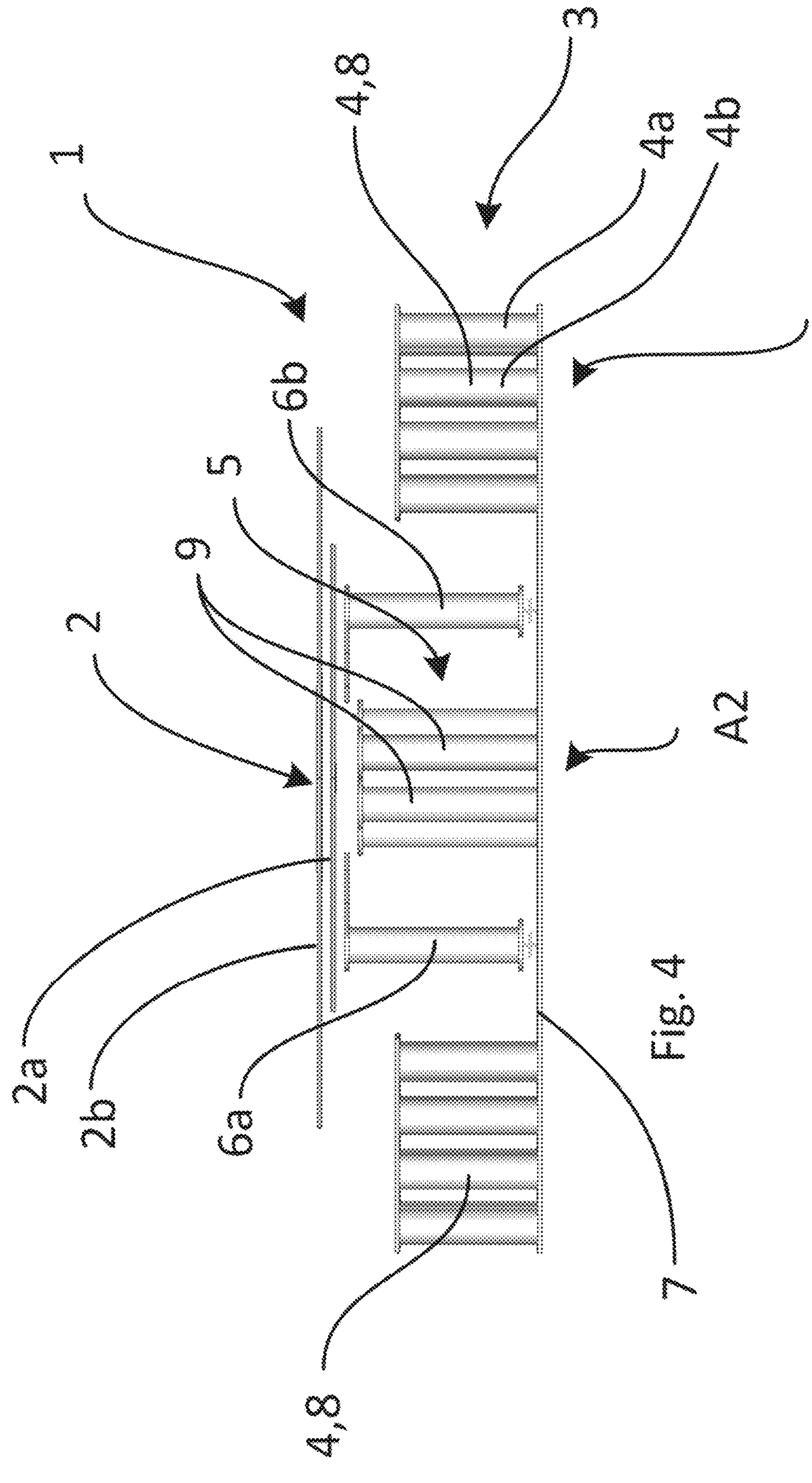
FIG. 4 shows a cross-sectional side view of an antenna element according to an embodiment.

At least one isolation via 9 may extend in parallel with the plurality of first vias 8, the isolation via 9 extending from a center area A2 of the bottom element 7 across the aperture 5 as shown in FIGS. 4 and 5. The patch antenna 2 is substantially superposed over the center area A2, as indicated in FIG. 4. The isolation vias separate, i.e. extend between, the first feed line 6*a* and the second feed line 6*b*, and are arranged to reduce the coupling between the first feed line 6*a* and the second feed line 6*b*, in order to improve the dual polarization achieved. The configuration of the isolation via(s) 9, i.e. the radius and height, is used to control the isolation. The isolation vias 9 may be capacitively or galvanically coupled to the patch antenna 2.

At least one second via 10 may extend, as shown in FIG. 6, in parallel with the plurality of first vias 8 and optionally in parallel with the isolation vias 9. The second via 10 extends across the aperture 5 from an intermediate area A3 of the bottom element 7. The intermediate area A3 extends between the center area A2 and the peripheral area A1 of the bottom element 7, as shown in FIGS. 4 and 6. In one embodiment, the patch antenna 2 is not superposed over the intermediate area A3 and/or the second vias 10, as indicated in FIG. 6.

The wall elements 4 may together form an equiangular and equilateral polygon, such as a square as shown in the FIGS. Nevertheless, the wall elements may be arranged in any suitable shape. The patch antenna 2 and the conductive structure 3 may both have rectangular outlines. As shown in FIGS. 1 and 2, the patch antenna 2 and the conductive structure 3 may be arranged without relative rotation such that the peripheral edges of the patch antenna 2 and the peripheral edges of the conductive structure 3 extend in parallel. As shown in FIGS. 3 and 5 to 7, the patch antenna 2 and the conductive structure 3 may be arranged with relative rotation such that, e.g., the patch antenna 2 is rotated by 45° relative the conductive structure 3.

The bottom element 7 of the conductive structure 3 may have a main surface area which extends in parallel with, and is larger than, a main surface area of the patch antenna 2, as shown in all FIGS. The main surface area of the patch antenna 2 extends in the main plane P1. The main surface area of the bottom element 7 is separated from the main surface area of the patch antenna 2 by a distance corresponding to the length of the first vias 8, second vias 10, and/or isolation vias 9.

Figure 2A:
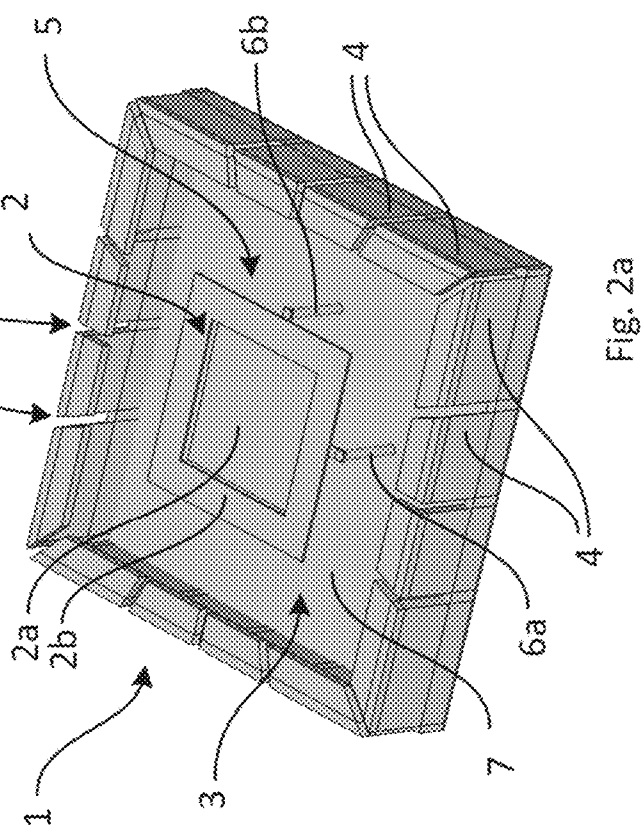
FIG. 2*a* shows a schematic perspective view of an antenna element according to an embodiment.
Figure 2B:
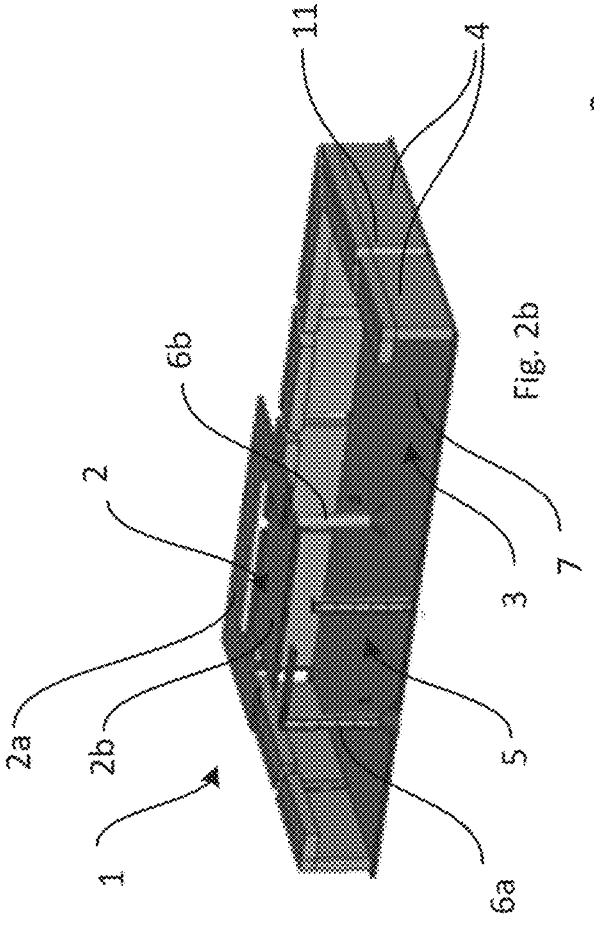
FIG. 2*b* shows a partial perspective view of the embodiment of FIG. 2*a;*

The wall element 4 may comprise at least one dielectric gap 11, as shown in FIGS. 2*a* and 2*b*. Furthermore, adjacent wall elements 4 may be separated by a dielectric gap 11, as shown in FIGS. 3 and 5 to 7. The dielectric gap 11 may be a longitudinal slot extending in a direction perpendicular to the main plane P1, preferably parallel with the first vias 8, second vias 10, and/or isolation vias 9.

As shown in FIGS. 3 and 5 to 7, the conductive structure may comprise four wall elements 4 and four dielectric gaps 11 separating adjacent wall elements 4.

Furthermore, as also shown in FIGS. 3 and 5 to 7, each wall element 4 may be arranged in an L-shape. The L-shape extends along a corner of the bottom element 7 of the conductive structure 3 such that a first leg of the wall element 4 extends partially along a first peripheral edge of the bottom element 7 and a second leg of the wall element 4 extends partially along a second peripheral edge of the bottom element 7. The first peripheral edge and the second peripheral edge extend perpendicular to each other.

The patch antenna 2 may be a single center patch 2*a* antenna or a stacked patch antenna 2*a*, 2*b*. The stacked patch antenna 2 may comprise a center patch 2*a* and one peripheral patch 2*b*, as shown in the FIGS., or several peripheral patches 2*b* (not shown). The center patch 2*a* and the peripheral patches 2*b* are stacked such that a main plane of the center patch 2*a* and a main plane of the peripheral patch 2*b* extend in parallel, or coplanar, with the main plane P1 of the stacked patch antenna 2.

The center patch 2*a* may comprise an integral surface area having a peripheral edge, the surface area being circular, rectangular or otherwise polygonal, optionally an equiangular and equilateral polygon such as a square. The peripheral patch 2*b* may comprise a surface having a center opening, such that the surface has an outer peripheral edge as well as an inner peripheral edge forming the edge of the center opening.

The shape of the center opening of the peripheral patch 2*b* may correspond to the shape of the center patch 2*a*, i.e. the inner peripheral edge of the peripheral patch 2*b* has a shape corresponding to the shape of the peripheral edge of the center patch 2*a*. Optionally, a gap 13 between the inner peripheral edge of the peripheral patch 2*b* and the peripheral edge of the center patch 2*a*, which is constant, may be formed.

The outer dimensions of the center patch 2*a* may be the same or smaller than the inner dimensions of the peripheral patch 2*b* such that the peripheral patch 2*b* encloses the center patch 2*a*, as suggested in FIG. 1. Furthermore, the outer dimensions of the center patch 2*a* may be larger than the inner dimensions of the peripheral patch 2*b* such that the center patch 2*a* encloses the peripheral patch 2*b* (not shown).

The first feed line 6*a* and the second feed line 6*b* may be coupled to the center patch 2*a*, both feed lines being coupled off-center with respect to the surface area of the center patch 2*a*, optionally adjacent the peripheral edge of the center patch 2*a*.

The center patch 2*a* may comprise a thoroughgoing recess 12. The recess 12 may have a square cross-shape, as shown in FIGS. 5 to 7, however any suitable shape is possible.

The patch antenna 2 and the conductive structure 3 may configured such that multiple resonance frequencies F1, F2, F3, F4 are achieved, wherein F1>F2>F3>F4. At least four resonance frequencies can be achieved, optionally more.

The aperture 5 of the conductive structure 3 may be configured to generate a first resonance frequency F1 and a fourth resonance frequency F4. Furthermore, the patch antenna 2 may be configured to generate a second resonance frequency F2 and a third resonance frequency F3.

The dielectric gap 11 may be configured to expand the bandwidth of the third resonance frequency F3 such that the fourth resonance frequency F4 is generated.

The patch antenna 2 may be configured to expand the bandwidth of the second resonance frequency F2 and/or the third resonance frequency F3. The size of the center patch 2*a* may affect the second resonance frequency F2 and the size of the peripheral patch 2*b* may affect the third resonance frequency F3.

The conductive structure 3 may be configured to expand the bandwidth of the first resonance frequency F1 and/or the fourth resonance frequency F4. The inner dimensions such as the height and the thickness of the wall elements 4 mainly affect the first resonance frequency F1. The outer dimensions, such as the footprint of the aperture 5 and the dielectric gaps 11, mainly affect the fourth resonance frequency F4.

The second via 10 may be configured to expand the bandwidth of the first resonance frequency F1 and/or the second resonance frequency F2.

The thoroughgoing recess 12 may be configured to expand the bandwidth of the second resonance frequency F2.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

What is claimed is:

1. An antenna element comprising:

a conductive structure comprising:

a bottom element extending in a bottom plane, and at least one wall element at least partially enclosing an aperture, the at least one wall element comprising a plurality of wall vias extending from a peripheral area of the bottom element in a direction perpendicular to the bottom plane;

a patch antenna extending in a main plane and being superposed over a center area of the bottom element, the patch antenna comprising a center patch that extends in the main plane and a peripheral patch that extends in a peripheral plane;

a first feed line and a second feed line, the first feed line and the second feed line extending in the direction perpendicular to the bottom plane from the bottom element across the aperture and being coupled to the patch antenna;

at least one intermediate element comprising one or more intermediate vias extending from an intermediate area of the bottom element in the direction perpendicular to the bottom plane; and one or more isolation vias extending from the center area of the bottom element across the aperture and separating the first feed line from the second feed line, wherein the main plane is parallel to the bottom plane and to the peripheral plane, wherein the intermediate area of the bottom element extends between the peripheral area of the bottom element and the center area of the bottom element, wherein the at least one wall element comprises at least one dielectric gap, wherein the center patch comprises a thoroughgoing recess, and wherein the throughgoing recess is superposed over at least one of the one or more isolation vias.

2. The antenna element according to claim 1, wherein the at least one wall element comprises a plurality of wall elements that together form an equiangular and equilateral polygon, the bottom element of the conductive structure having a main surface area which extends in parallel with, and is larger than, a main surface area of the patch antenna.

3. The antenna element according to claim 1, wherein the dielectric gap is a longitudinal slot extending in the direction perpendicular to the bottom plane.

4. The antenna element according to claim 1, wherein the first feed line and the second feed line are coupled to the center patch at a first coupling and a second coupling, wherein the first and second couplings are off-center with respect to a surface area of the center patch, and wherein the first and second couplings are arranged adjacent a peripheral edge of the center patch.

5. The antenna element according to claim 1, wherein a surface area of the center patch forms an equiangular and equilateral polygon.

6. The antenna element according to claim 5, wherein the peripheral patch has an inner peripheral edge having a shape corresponding to a shape of a peripheral edge of the center patch, such that a gap between the inner peripheral edge of the peripheral patch and the peripheral edge of the center patch is constant.

7. The antenna element according to claim 1, wherein the patch antenna and the conductive structure are configured to provide multiple resonance frequencies F1, F2, F3, and F4, wherein F1>F2>F3>F4.

8. The antenna element according to claim 7, wherein the patch antenna is configured to generate the resonance frequencies F2 and F3, and wherein the conductive structure is configured to generate the resonance frequencies F1 and F4.

9. The antenna element according to claim 7, wherein the resonance frequency F1 is a first resonance frequency determined by at least a height and/or a thickness of the at least one wall element, wherein the resonance frequence F2 is a second resonance frequency determined by a size of the center patch, wherein the at least one intermediate element is configured to expand the bandwidth of the first resonance frequency and/or the second resonance frequency, wherein the resonance frequency F3 is a third resonance frequency determined by a size of the peripheral patch, and wherein the resonance frequency F4 is a fourth resonance frequency determined by at least the footprint of the aperture and/or the at least one dielectric gap.

10. An antenna array comprising:

a plurality of antenna elements according to claim 1, wherein the plurality of antenna elements are arranged such that the at least one wall element of one antenna element is connected to a corresponding wall element of an adjacent antenna element.

11. An apparatus comprising at least one antenna element according to claim 1.

12. The antenna element according to claim 1, wherein the at least one wall element comprises four wall elements, and wherein each of the four wall elements comprises a respective dielectric gap.

13. The antenna element according to claim 12, wherein the at least one intermediate element comprises four intermediate elements, and wherein each respective intermediate element separates a respective wall element from the patch antenna.

14. The antenna element according to claim 1, wherein the first feed line and the second feed line are galvanically coupled to the patch antenna.

15. The antenna element according to claim 1, wherein the bottom element is rectangular, wherein the patch antenna is rectangular, wherein the throughgoing recess is formed from two intersecting, perpendicular slots, and wherein neither of the two intersecting, perpendicular slots is parallel to any edge of the bottom element.

16. An antenna element comprising:

a conductive structure comprising:

a bottom element extending in a bottom plane, and at least one wall element at least partially enclosing an aperture, the at least one wall element comprising a plurality of wall vias extending from a peripheral area of the bottom element in a direction perpendicular to the bottom plane;

a patch antenna extending in a main plane and being superposed over a center area of the bottom element, the patch antenna comprising a center patch and a peripheral patch, the center patch extending in the main plane and the peripheral patch extending in a peripheral plane parallel to the main plane;

a first feed line and a second feed line, the first feed line and the second feed line extending in the direction perpendicular to the bottom plane from the bottom element across the aperture and being coupled to the patch antenna; and at least one intermediate element comprising one or more intermediate vias extending from an intermediate area of the bottom element in the direction perpendicular to the bottom plane, wherein the main plane is parallel to the bottom plane, wherein the intermediate area of the bottom element extends between the peripheral area of the bottom element and the center area of the bottom element, wherein the at least one wall element comprises at least one dielectric gap, wherein the patch antenna and the conductive structure are configured to provide multiple resonance frequencies F1, F2, F3, and F4, wherein F1>F2>F3>F4, wherein the resonance frequency F1 is a first resonance frequency determined by at least a height and/or a thickness of the at least one wall element, wherein the resonance frequence F2 is a second resonance frequency determined by a size of the center patch, wherein the at least one intermediate element is configured to expand the bandwidth of the first resonance frequency and/or the second resonance frequency, wherein the resonance frequency F3 is a third resonance frequency determined by a size of the peripheral patch, and wherein the resonance frequency F4 is a fourth resonance frequency determined by at least the footprint of the aperture and/or the at least one dielectric gap.

17. The antenna element according to claim 16, further comprising one or more isolation vias extending from the center area of the bottom element across the aperture and separating the first feed line from the second feed line.

18. The antenna element according to claim 16, wherein the at least one wall element comprises a plurality of wall elements that together form an equiangular and equilateral polygon, the bottom element of the conductive structure having a main surface area which extends in parallel with, and is larger than, a main surface area of the patch antenna.

19. The antenna element according to claim 16, wherein the dielectric gap is a longitudinal slot extending in the direction perpendicular to the bottom plane.

20. The antenna element according to claim 16, wherein the patch antenna is configured to generate the resonance frequencies F2 and F3, and wherein the conductive structure is configured to generate the resonance frequencies F1 and F4.

* * * * *